(12) United States Patent
Omran et al.

(10) Patent No.: US 10,126,716 B2
(45) Date of Patent: Nov. 13, 2018

(54) ELECTRONIC BYPASS SYSTEM

(71) Applicant: SAUDI BASIC INDUSTRIES CORPORATION, Riyadh (SA)

(72) Inventors: Mohamed Abdel-Raouf Omran, Jubail (SA); Waghayan Muhammad Al-Dossary, Jubail (SA); Abduljaleel Hassan Al-Alwan, Jubail (SA); Ayman Fahad Al-Zahri, Jubail (SA)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 153 days.

(21) Appl. No.: 15/116,832

(22) PCT Filed: Feb. 11, 2015

(86) PCT No.: PCT/IB2015/051029
§ 371 (c)(1),
(2) Date: Aug. 5, 2016

(87) PCT Pub. No.: WO2015/121807
PCT Pub. Date: Aug. 20, 2015

(65) Prior Publication Data
US 2016/0349712 A1    Dec. 1, 2016

Related U.S. Application Data

(60) Provisional application No. 61/938,228, filed on Feb. 11, 2014.

(51) Int. Cl.
*G05B 9/02* (2006.01)
*G05B 19/042* (2006.01)

(52) U.S. Cl.
CPC ........... *G05B 9/02* (2013.01); *G05B 19/0428* (2013.01); *G05B 2219/13075* (2013.01); *G05B 2219/14006* (2013.01)

(58) Field of Classification Search
None
See application file for complete search history.

(56) References Cited

U.S. PATENT DOCUMENTS 4,976,377 A * 12/1990 Higuchi .................... G01F 1/76
                                                     137/487.5
5,499,505 A *  3/1996 Gistau-Baguer .......... F25B 9/00
                                                     62/228.3

(Continued)

FOREIGN PATENT DOCUMENTS

JP    01284904 A    11/1989
JP    3057629 B2     7/2000

OTHER PUBLICATIONS

International Search Report for International Application No. PCT/IB2015/051029; International Filing Date: Feb. 11, 2015; dated Jun. 5, 2015; 4 pages.

(Continued)

*Primary Examiner* — Adam Lee
(74) *Attorney, Agent, or Firm* — Cantor Colburn LLP

(57) ABSTRACT

An electronic bypass system can include receiving a request to bypass a plant interlock system. A review of the request can be facilitated by a computer and, based on input from at least one reviewer, results in the request being approved or not approved. The facilitating can include: notifying the at least one reviewer of the request, storing the request and a status of the request in a database that includes bypass statuses of a plurality of plant interlock systems, and prompting the at least one reviewer to respond based on not receiving input from the at least one reviewer within a specified review time period. Based on the result of the review, the status of the request can be updated in the database to approved or not approved. A report that includes the status of the request can be generated.

16 Claims, 6 Drawing Sheets

(56) References Cited

U.S. PATENT DOCUMENTS

| | | | |
|---|---|---|---|
| 6,010,032 A * | 1/2000 | Vermylen | B01F 15/0412 222/1 |
| 6,105,942 A * | 8/2000 | Kurzer | A23L 2/54 261/119.1 |
| 6,219,648 B1 * | 4/2001 | Jones | G06Q 10/06311 340/506 |
| 6,280,408 B1 * | 8/2001 | Sipin | A61M 5/1483 604/65 |
| 7,096,092 B1 * | 8/2006 | Ramakrishnan | E21B 43/00 340/853.1 |
| 8,014,756 B1 * | 9/2011 | Henderson | G06Q 10/103 455/411 |
| 2002/0062367 A1 * | 5/2002 | Debber | G06F 9/50 709/224 |
| 2002/0161554 A1 | 10/2002 | Ditter et al. | |
| 2004/0249691 A1 * | 12/2004 | Schell | G06Q 10/06311 705/7.13 |
| 2005/0091087 A1 * | 4/2005 | Smith | G06Q 10/02 705/5 |
| 2005/0091099 A1 * | 4/2005 | Krueger | G06Q 10/063 705/343 |
| 2006/0031932 A1 * | 2/2006 | Vail | G06Q 10/10 726/22 |
| 2006/0041794 A1 * | 2/2006 | Aaron | G09B 7/00 714/47.2 |
| 2006/0189783 A1 * | 8/2006 | Deiss | B01J 8/003 528/272 |
| 2006/0282291 A1 * | 12/2006 | Runciman | G06F 19/3487 705/3 |
| 2007/0006939 A1 * | 1/2007 | Clusserath | B67C 3/12 141/40 |
| 2008/0168531 A1 * | 7/2008 | Gavin | H04L 63/1408 726/1 |
| 2009/0024952 A1 * | 1/2009 | Brush | G06Q 10/109 715/781 |
| 2009/0052675 A1 * | 2/2009 | Levow | G06F 21/33 380/278 |
| 2009/0054735 A1 * | 2/2009 | Higgins | A61B 5/0006 600/300 |
| 2009/0106365 A1 * | 4/2009 | Drory | G06Q 10/107 709/206 |
| 2009/0123385 A1 * | 5/2009 | Bohmer | A61K 49/223 424/9.52 |
| 2009/0130025 A1 * | 5/2009 | Bohmer | A61K 49/223 424/9.52 |
| 2009/0317963 A1 * | 12/2009 | Nakamoto | H01J 37/32412 438/513 |
| 2010/0223285 A1 * | 9/2010 | Biddulph-Krentar | G16H 50/20 707/769 |
| 2011/0000142 A1 * | 1/2011 | Bui | A62C 99/0072 52/16 |
| 2011/0100027 A1 * | 5/2011 | Schnell | G01R 33/31 62/51.1 |
| 2011/0196304 A1 * | 8/2011 | Kramer | A61M 5/1407 604/151 |
| 2011/0271953 A1 * | 11/2011 | Wortnnann | F28D 20/0034 126/619 |
| 2012/0010750 A1 * | 1/2012 | Wahl | A61L 2/28 700/266 |
| 2012/0209650 A1 * | 8/2012 | Romagnino | G06Q 10/06 705/7.15 |
| 2012/0293592 A1 * | 11/2012 | Hibbard | B41J 2/175 347/92 |
| 2013/0011257 A1 * | 1/2013 | Lim | F03B 13/24 416/1 |
| 2013/0020098 A1 * | 1/2013 | Bui | A62C 99/0072 169/16 |
| 2013/0054467 A1 * | 2/2013 | Dala | G06F 19/322 705/51 |
| 2013/0136222 A1 | 5/2013 | Nagai et al. | |
| 2013/0159033 A1 * | 6/2013 | Weinstock | G06Q 10/02 705/5 |
| 2013/0211559 A1 * | 8/2013 | Lawson | G06Q 10/06315 700/83 |
| 2013/0301820 A1 * | 11/2013 | Williams | H04M 3/42195 379/201.01 |

OTHER PUBLICATIONS

Written Opinion for International Application No. PCT/IB2015/051029; International Filing Date: Feb. 11, 2015; dated Jun. 5, 2015; 6 pages.

Rockwell Automation, "PlantPAx™ Library of Process Objects", 2013, 6 pages.

Plant Safety & SIS, Interlocks: Basic Design Principles, http://www.processoperations.com/SafeInstrSy/SS_Chp02d.htm, 2013, 2 pages.

* cited by examiner

| My Assignment | Extend/Normalize ByPass | | Plant ByPass Status | | Log Out |
|---|---|---|---|---|---|

402

| ByPass Number | BP/SF4-AM/131-2012 | Raised By | Saeed-al, Muhammad Ali |
|---|---|---|---|
| Site Name | SF4 | Plant Name | Ammonia |
| Tag Number | 41-FFI-1155A | Service | |
| Effictive Date | 11/5/2012 | Duration | 1 days |
| Reason of Bypassing interlock | PM job | | |
| Work to be performed | PM job | | |
| Backup Sytem (alternatives) and precautions | 41-FFI-1155 B/C | | |
| Mandatory Shutdown Limit | 2.4 | | |
| Method to Shutdown process, if required | Emerg. psh button | | |
| Communicated to Area Operator | Yes | | |

404

| Supdt Comments | ok |
|---|---|
| Manager Comments | |
| GM Recommended Removal Date | |
| GM Comments | |

406

| Comments | |
|---|---|

| Date | Time | Action Taken | Action By |
|---|---|---|---|
| 11/5/2012 | 8:23:33 AM | Interlock ByPass Raised | Saeed-al, Muhammad Ali |
| 11/5/2012 | 10:32:53 AM | Interlock ByPass Approved by Supdt | Beeshi-al, Mofleh Turki |
| 11/6/2012 | 5:46:57 AM | Interlock ByPass Normalization Requested By Supdt | Beeshi-al, Mofleh Turki |
| 11/6/2012 | 7:10:17 AM | Interlock ByPass Removed By Inst. Supervisor | Nasser-al, Saad Muhammad |
| 11/6/2012 | 10:52:58 AM | Interlock Bypass Closed by Supervisor | Sowail-al, Muhammad Taher |

| # | ByPass No. | Tag No. | Approved By | Effective Date/ Time Duration | Removed By | Removal Date | Closed By | Close Date | Status |
|---|---|---|---|---|---|---|---|---|---|
| 158 | BP/SF2-AM/154-2012 | 1-FSLLL322 | Ajmi-al, Nasser Mubarak | 11/11/2012 9:10:23 AM | Dossary-Al, Fahad Abdulaziz | 11/12/2012 | Whaib-al, Salman Ali | 11/12/2012 | Closed |
| 159 | BP/SF2-AM/155-2012 | 1-FSLLL322 | Ajmi-al, Nasser Mubarak | 11/11/2012 9:10:35 AM | Dossary-Al, Fahad Abdulaziz | 11/12/2012 | Whaib-al, Salman Ali | 11/12/2012 | Closed |
| 160 | BP/SF4-UT/153-2012 | 43-LI-5021A | Homoud-al, Salah Dawood | 11/12/2012 8:17:11 AM | Mubarak-al, Nasser Abdulsamad | 11/12/2012 | | | To Be Closed |
| 161 | BP/SF4-AM/156-2012 | 41LT7022 | Beeshi-al, Mofleh Turki | 11/12/2012 8:57:24 AM | Mubarak-al, Nasser Abdulsamad | 11/12/2012 | Sawai-al Muhammad Taher | 11/12/2012 | Closed |
| 162 | BP/SF3-AM/158-2012 | 21-PSL-1921 | Rashed-al, Ahmed Saleh | 11/13/2012 7:59:06 AM | | | | | To Be Normalized |
| 163 | BP/SF3-AM/159-2012 | 21-XE1222V/Y | Rashed-al, Ahmed Saleh | 11/13/2012 7:59:46 AM | | | | | To Be Normalized |
| 164 | BP/SF3-UR/157-2012 | 22-Fsl1120_b | Qahtani-Al, Muhammad Hanash | 11/13/2012 7:51:00 AM | | | | | To Be Normalized |
| 165 | BP/SF4-AM/160-2012 | 41-FI-8006 | Beeshi-al, Mofleh Turki | 11/13/2012 10:27:45 AM | | | | | To Be Normalized |
| 166 | BP/SF4-AM/161-2012 | 41-PT-7036A | Beeshi-al, Mofleh Turki | 11/13/2012 10:33:48 AM | | | | | To Be Normalized |
| 167 | BP/SF4-AM/162-2012 | 41-PT-7036B | Beeshi-al, Mofleh Turki | 11/13/2012 10:35:25 AM | | | | | To Be Normalized |
| 168 | BP/SF4-AM/163-2012 | 41-PT-7036C | Beeshi-al, Mofleh Turki | 11/13/2012 11:04:20 AM | | | | | To Be Normalized |
| 169 | BP/SF4-AM/164-2012 | 41-PT-7035A | Beeshi-al, Mofleh Turki | 11/13/2012 11:04:27 AM | | | | | To Be Normalized |
| 170 | BP/SF4-AM/165-2012 | 41-PT-7035B | Beeshi-al, Mofleh Turki | 11/13/2012 11:04:34 AM | | | | | To Be Normalized |
| 171 | BP/SF4-AM/166-2012 | 41-PT-7035C | Beeshi-al, Mofleh Turki | 11/13/2012 11:04:42 AM | | | | | To Be Normalized |

Fig. 5

ELECTRONIC BYPASS SYSTEM

CROSS REFERENCE TO RELATED APPLICATIONS

This application is a 371 of International Application No. PCT/IB2015/051029, filed Feb. 11, 2015, which claims priority to U.S. Application No. 61/938,228, filed Feb. 11, 2014 both which are incorporated herein by reference in their entirety.

BACKGROUND OF THE INVENTION

This disclosure generally relates to an electronic bypass system, and, more particularly to an electronic bypass system for facilitating and monitoring bypasses to plant interlock systems.

Manufacturing plants typically utilize several types of plant safety systems such as alarms, safety trips, interlocks, and pressure relieving systems. Plant interlock systems may be used to enforce a fixed sequence of operations, for example, during a plant start-up or shutdown process. During plant start-up, interlocks are often used to provide safety protection by requiring that certain permissible conditions exist before proceeding to a next stage of the process. Interlock systems are inserted into the process to prevent operations from departing from the fixed sequence. An interlock system is a group of devices arranged to sense an operating limit or off-limit condition, or an improper sequence of events, and is used to shut down the process or prevent the process from proceeding if any are detected. An interlock system often includes various alarms and safety trips.

Safety interlocks are also applied in locking and unlocking closing valves in a chemical plant. A closing valve provided with an interlock system may be locked in the closed position (locked closed system) or locked in an open position (locked open system). By providing closing valves with an interlock, undesired operation thereof can be prevented. It is also possible, using the locking mechanism on a number of different closing valves, to ensure a correct, predetermined sequence of closing or opening of the closing valves that may be used, for example, to prevent hazardous situations.

Safety interlocks may be bypassed temporarily for a variety of reasons, such as system maintenance. A typical interlock bypass procedure includes an operation supervisor filling in a bypass request form and handing it to a plant superintendent. The plant superintendent then reviews the request and approves the bypass for a specified time period (e.g., twenty-four hours). The approved bypass request form is then handed back to the operation supervisor who takes the appropriate action to bypass the safety interlock. This current manual method of implementing interlock bypassing is often time consuming and it is difficult to get a view of the current status of safety interlocks and bypass activities (bypasses in place, bypasses requested, etc.) across one or more plant locations.

There continues to be a need in the art for efficient methods to facilitate and monitor the bypass of safety interlocks.

SUMMARY

Disclosed herein is an electronic bypass system.

In an embodiment a method, computer program product, or a system can receive a request to bypass a plant interlock system. A review of the request can be facilitated by a computer and, based on input from at least one reviewer, results in the request being approved or not approved. The facilitating can include: notifying at least one reviewer of the request, storing the request and a status of the request in a database that includes bypass statuses of a plurality of plant interlock systems, and prompting the at least one reviewer to respond based on not receiving input from the at least one reviewer within a specified review time period. Based on the result of the review, the status of the request can be updated in the database to approved or not approved. A report that includes the status of the request can be generated.

These and other non-limiting features and characteristics are more particularly described below.

BRIEF DESCRIPTION OF THE FIGURES

Refer now to the figures, which are exemplary embodiments, and wherein the like elements are numbered alike.

FIG. 4 is an example of an electronic bypass system approval report.

FIG. 5 is an example of an electronic bypass system status report.

DETAILED DESCRIPTION OF THE INVENTION

An embodiment provides an electronic bypass system that can facilitate and monitor bypasses to plant interlock systems. The electronic bypass system can be used to document the approval authorities for bypass activities, to facilitate the bypass approval process, and to generate reminders to reactivate interlock systems that have been bypassed. Use of the electronic bypass system can also minimize the manual handling of paperwork and provide visibility to the status of bypass activities.

Embodiments described herein can provide online monitoring for all bypass statuses (e.g., requested, pending approval, active, normalized). Electronic bypass requests can be approved by the assigned authorized person(s) from any location using an intranet or other network to connect to the electronic bypass system. In addition, the electronic bypass system can provide automated reminders for quick and timely action. A database can also be maintained for reporting and analysis of current and previous bypass activities.

The terms "electronic bypass system" and "electronic bypass tool" are used interchangeably herein to refer to hardware and/or software for implementing embodiments described herein.

Figure 1:
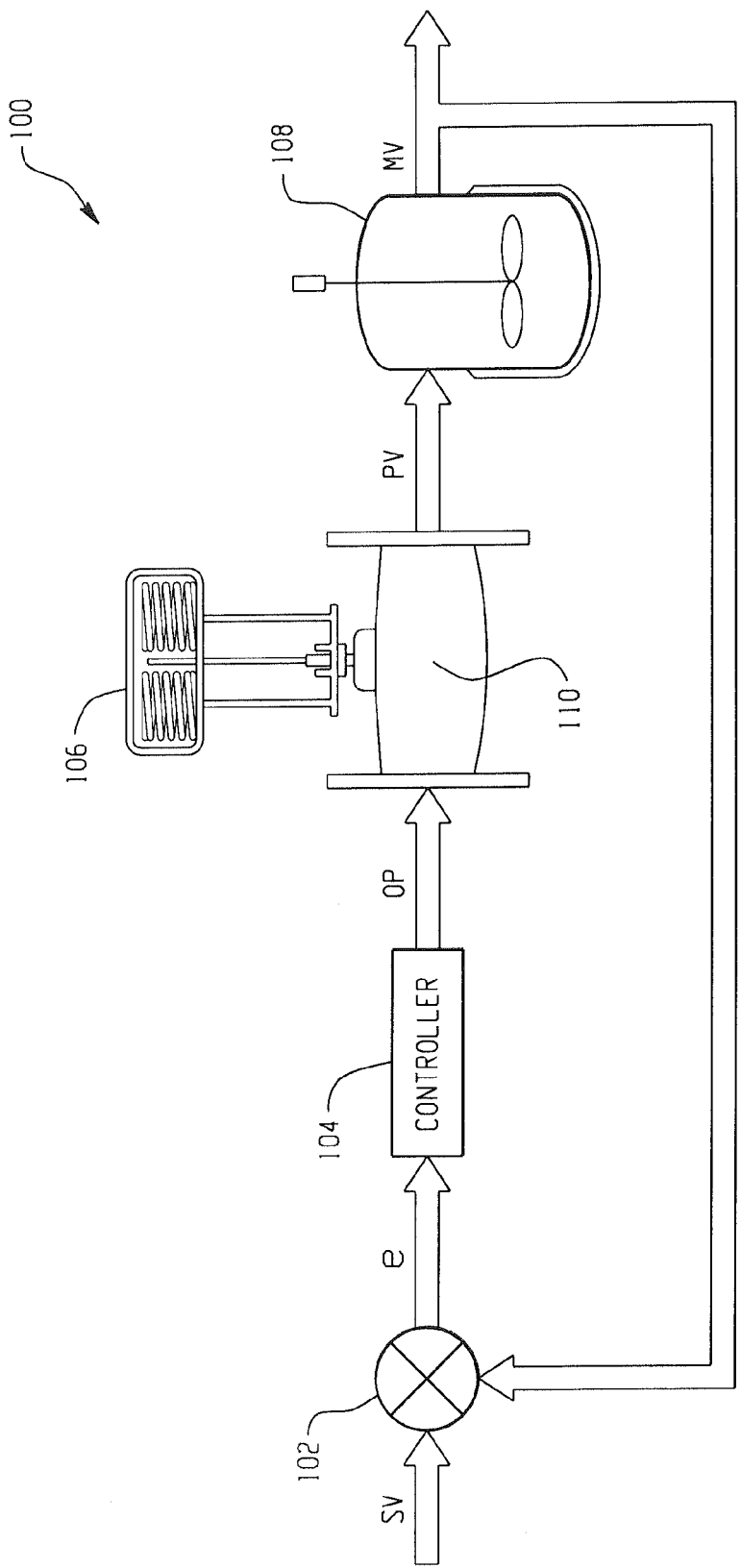
FIG. 1 is an example of a control loop having a plant interlock system.

Turning now to FIG. 1, an example of an interlock system 100 is generally shown. As shown in FIG. 1, the interlock system 100 can be a control loop for a control valve 106 to control a flow of gas or fluid out of a container 110 attached to the control valve 106. The control loop can include a comparator 102, a controller 104, the control valve 106, and a measurement sensor 108. The control loop can be set up to keep a process variable (PV) (e.g., fluid flow) at or close to a desired set-point value (SV). The measurement sensor 108 can determine a measured value (MV) of the PV. The SV and the MV of the PV can be input to the comparator 102 to produce an error value ("e"). In an embodiment, the value of "e" is calculated by subtracting the MV from the SV. The value of "e" can be input to the controller 104, and the controller 104 can generate controller output (OP) based on the value of "e". As shown in the control loop of FIG. 1, the controller output, OP, is a control valve adjustment value which reflects an estimate of how the control valve 106 should be adjusted (e.g., open or shut or no movement) to maintain the PV at the desired value.

A request to bypass the interlock system 100 can occur, for example, when the controller 104 has a scheduled or unscheduled maintenance activity (e.g., a new version of computer code is being installed). The bypass can include shutting down the controller 104 and having an employee of the plant make adjustments to the control valve 106 manually. In addition, the comparator 102 and/or the measurement sensor 108 can also be shut down and bypassed during the bypass of the interlock system 100 shown in FIG. 1.

As used herein, the terms "plant interlock system" or "interlock system" refer to a group of devices arranged to sense an operating limit or off-limit condition, or an improper sequence of events, and is used to shut down the process or prevent the process from proceeding if any are detected. As used herein, the terms "plant interlock system bypass" or "bypass" refer to shutting off the interlock system. As used herein, the terms "normalization" and "removal of the plant interlock system bypass" refer to turning the interlock system back on.

An interlock system can automatically inhibit the operation of equipment until certain process parameters are within acceptable ranges. Process parameters can include, but are not limited to, those measured at pressure safety valves (PSVs), and those measured at safety, health and environment (SHE) critical instruments. PSVs and/or SHE critical instruments can be bypassed by taking them out of the interlock system loop through isolating them, taking them out of service or by making them unavailable. The interlock system can be normalized when the bypassed element is restored or put back into the interlock system loop.

Figure 2:
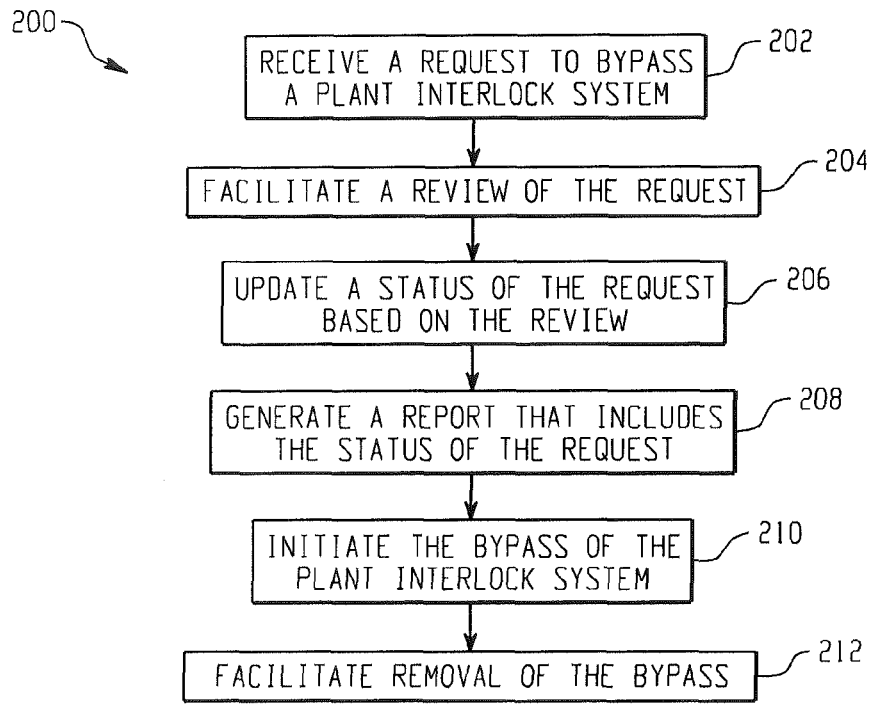
FIG. 2 is an example of a process flow implemented by an electronic bypass system.

Turning now to FIG. 2, a process flow 200 that can be implemented by an electronic bypass system is generally shown in accordance with an embodiment. At block 202, a request to bypass a plant interlock system can be received. The request can be from a plant supervisor or other employee. The request can include information such as, but not limited to: an identifier of a plant interlock system, a date for the bypass, a number of days, and a reason for the bypass.

At block 204 a review of the request can be facilitated. The review can include getting input from at least one reviewer. The result of the review is that the bypass request has been approved or not approved (i.e., denied). The facilitating of the review can include notifying at least one reviewer of the request. The electronic bypass system can be customized to support different review processes based on customer requirements. For example, the review may require review by particular reviewer(s) (optionally in a particular order) based on a combination of one or more of characteristics of the plant interlock system to be bypassed (e.g., location, type of interlock system, etc.), a frequency of bypass requests having particular characteristics, and a requested duration of the bypass.

In addition, the facilitating, at block 204, can include storing the request and a status of the request (e.g., pending) in a database that includes bypass statuses of a plurality of plant interlock systems. The database can be a central repository for the status of plant interlock systems. The database can include information for plant interlock systems within particular physical buildings, within geographic areas, related to particular products, and or managed by particular business units. Having a single location for storing and tracking the status of plant interlock systems can provide visibility (e.g., through database queries, reporting) into a current status of plant interlock systems. In addition, historical data can also be maintained in the database and used, for example, to identify bypass trends.

The facilitating, at block 204, can further include prompting the reviewer(s) to respond based on not receiving input within a specified review time period. The specified review time period can be customized based on customer requirements and can vary based on factors such as, but not limited to, a review time specified by the requestor, a type of plant interlock system, and an urgency associated with the performing the bypass quickly.

Based on receiving input from one or more reviewers, the electronic bypass system can update an interim status of the request in the database. The electronic bypass system can also initiate a customized escalation process if input is not received from the reviewer within a specified time period. The escalation can be to notify particular employees within particular time frames.

At block 206, the status of the request can be updated in the database to approved or not approved based on the result of the review.

At block 208, a report that includes the status of the request can be generated. The report can include an email sent to particular employees to notify them to implement a bypass of the plant interlock system, to notify a requestor that the bypass request was not approved, or to notify an interested party (e.g., a manager, a safety engineer, etc.) of the status of the bypass request. In addition, the report can include a status of several bypass requests. The report can be generated based on contents of the database.

At block 210, if the bypass request was approved, the bypass of the plant interlock system can be initiated to place the plant interlock system in a bypass state. In addition, the database can be updated to record the bypass state for the plant interlock system.

At block 212, the removal of the bypass can be facilitated. The removal process can be customized (e.g., who should be notified, timeframe for notification) based on customer requirements. For example, based on a determination that the bypass has been in place longer than it was requested to be in place, a reminder can be transmitted to selected employee recipients to reactivate the plant interlock system. In addition, an escalation process that includes notifying additional employees (e.g., supervisors, managers) can be implemented based on the plant interlock system being in the bypass state for a specified time period.

Figure 3:
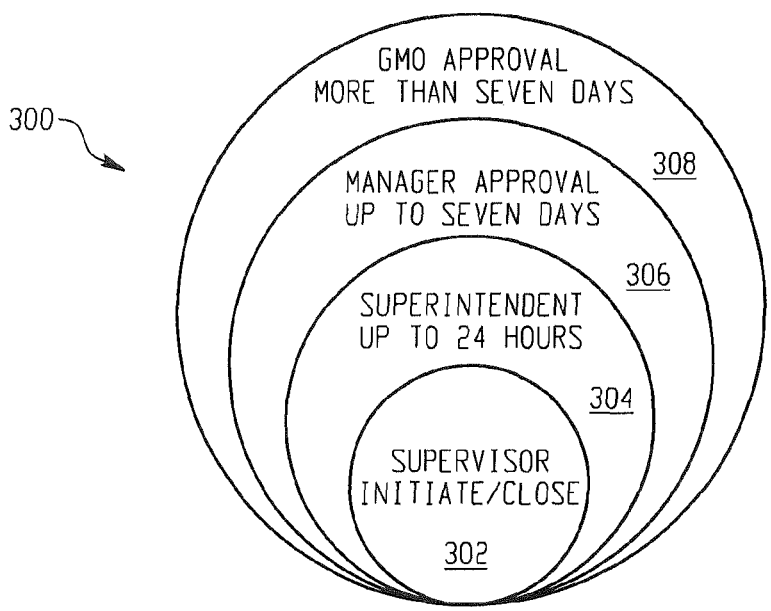
FIG. 3 is of an example of an approval workflow implemented by an electronic bypass system.

Turning now to FIG. 3, an approval workflow 300 that can be implemented by an electronic bypass system is generally shown in accordance with an embodiment. Embodiments of the electronic bypass system can be customized to require different levels of approval for a bypass request based on how long the bypass will be in place if the request is approved. As shown in FIG. 3, supervisors 302 are given the authority to initiate and close interlock system bypass requests, superintendents 304 are given the authority to approve bypass requests that last up to twenty four hours, managers 306 are given the authority to approve bypass requests that last up to seven days, and the approval of general managers 308 can be required for bypasses that last more than seven days. FIG. 3 shows one example of an approval workflow 300 and others can also be implemented. Other approval workflows can also take into account additional factors such as the type or location of the plant interlock system being bypassed.

Turning now to FIG. 4, an electronic bypass system approval report 400 is generally shown in accordance with an embodiment. In an embodiment, the approval report 400 is displayed on a user interface screen of a user system. The report 400 includes an option selection panel 402 where the report recipient can select different options related to bypasses in order to view different reports. The report 400 shown in FIG. 4 also includes bypass request information 404 entered, for example, by the requestor of a bypass. The bypass request information 404 shown in FIG. 4 includes, among other things, data specifying a bypass number, a site name, a plant name, an effective date, a reason of bypassing interlock, a back-up system, a duration, and a requestor name ("raised by"). The report 400 also includes reviewer comments 406 and bypass status history 408 to track the status of the bypass as it moves from a request to approved (or not approve) to implemented and then to normalized.

The format shown in FIG. 4 can also be presented by the electronic bypass system to a user for creating a bypass request, and to a reviewer for approving the bypass request. The data entered by the requestor and reviewer are saved in the database.

Turning now to FIG. 5, an electronic bypass system status report 500 is generally shown in accordance with an embodiment. The report 500 can be generated by executing a query against the database for all bypasses within a specified time period and for a particular plant (or other location). In an embodiment, the report 500 is displayed on a user interface screen of a user system. Any number of reports can be generated based on the data stored in the database. The reports can be customized based on customer requirements to focus on particular locations, on particular types of machinery or plant interlock systems, on particular managers, on particular dates, on particular timeframes (length of time for review, length of time bypass is in effect), etc.

Reports can be generated by the electronic bypass system on a periodic basis (e.g., daily, weekly, monthly) and automatically sent to specified recipients. Reports can reflect electronic bypass data for specified time frames. They can include summary data for all bypasses in a particular group such as, but not limited to: an entire company, a geographic location, a group of one or more departments, and a type of process or interlock system. In an embodiment, the summary report can be displayed via a user interface screen on a user device and the summary report can be manipulated to show the detail data behind the summary data in the report. One method of outputting a generated report is via email, other methods of outputting can also be used such as text messages or printing of hard copy reports.

The electronic bypass system can alert and prevent a requestor from requesting a bypass for an active tag. A pop-up message can appear that alerts the requestor that the same bypass already exists, and the electronic bypass system can prevent the requestor from proceeding.

Figure 6:
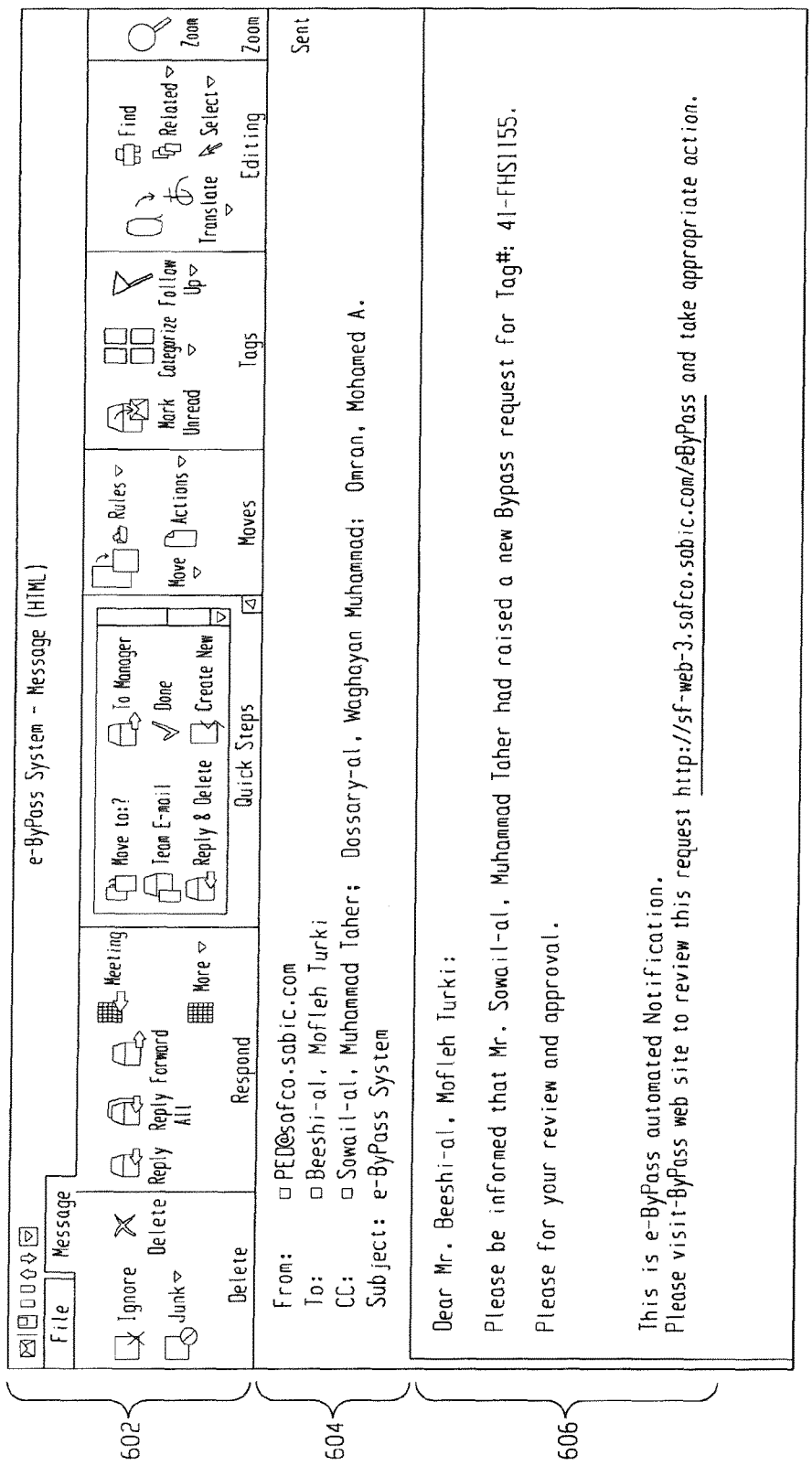
FIG. 6 is an example of an email notification of an electronic bypass system request.

Turning now to FIG. 6, an email notification 600 of an electronic bypass system request is generally shown in accordance with an embodiment. The email notification 600 includes mail system heading information 602, recipient and subject information 604, and review request content 606.

Figure 7:
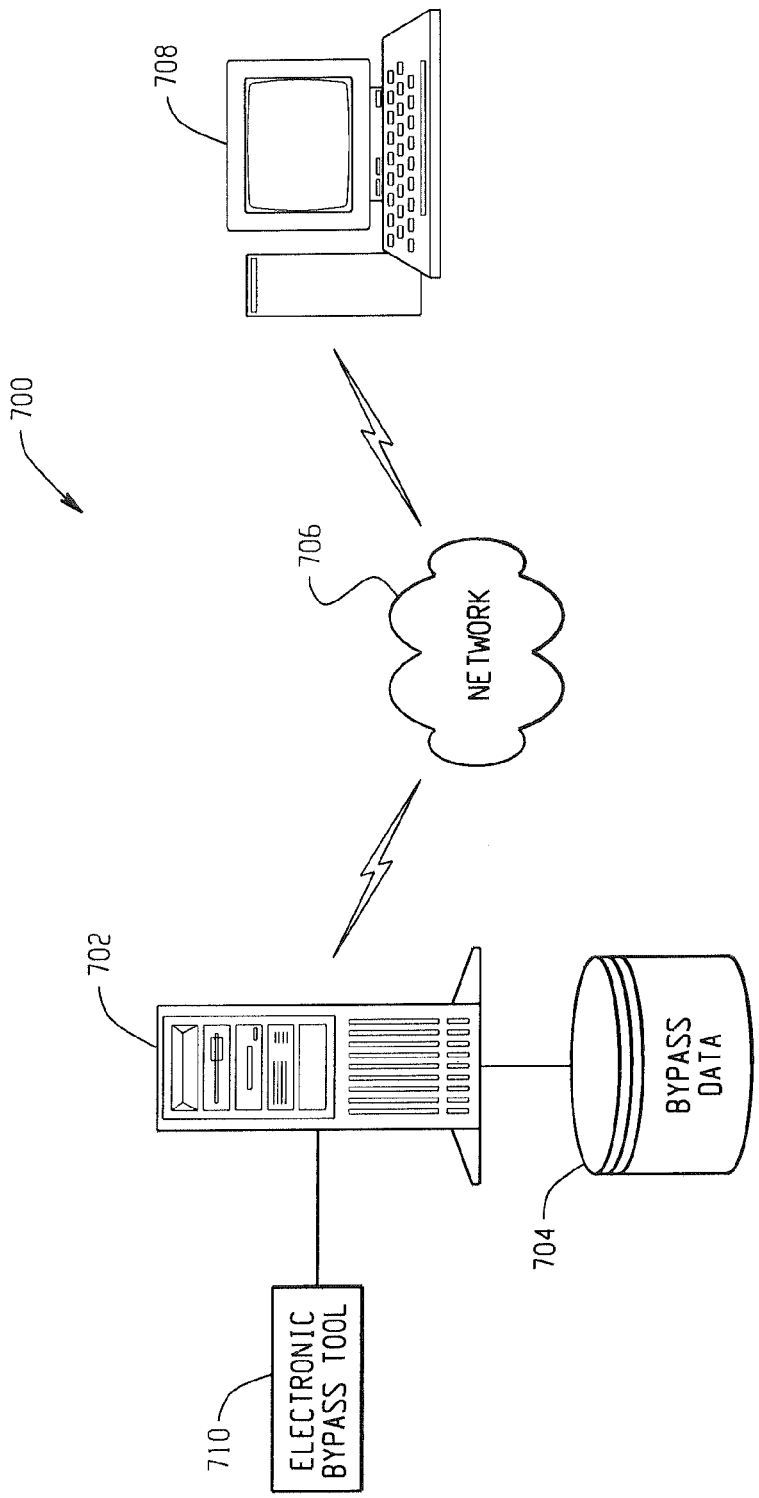
FIG. 7 is an example of a computer system for implementing an electronic bypass system.

Turning now to FIG. 7, a computer system upon which an electronic bypass tool 710 (also referred to herein as an "electronic bypass system") can be implemented will now be described in an exemplary embodiment. The computer system shown in FIG. 7 includes a host system 702 and one or more user systems 708. The user system 708 and host system 702 are communicatively coupled to one another via one or more networks 706. The host system 702 can be implemented as a high-speed computer processing device (e.g., a mainframe computer) capable of handling a high volume of activities conducted by the electronic bypass tool 710 and the user system 708 with regard to the host system 702. The host system 702 can be operated by an enterprise or organization implementing the exemplary electronic bypass tool 710 described herein. The host system 702 can operate as a web server including a web site for providing access to the electronic bypass tool 710.

The host system 702 can also operate as an application server including one or more applications or modules for providing the electronic bypass tool 710 described herein. The electronic bypass tool 710 can include logic for performing the processing described above in FIG. 2. In an embodiment, the host system 702 is communicatively coupled to a storage device 704, which can plant interlock system and bypass data, as well as related data used to facilitate the electronic bypass tool 710.

While the storage device 704 is shown in FIG. 7 as a separate physical device from the host system 702, it will be understood that the storage device 704 can be integrated into the host system 702 as internal storage (e.g., as a hard disk drive), or accessed by the host system 702 via the network.

The user device 708 can be any type of communications device capable of sending and receiving information over a network. For example, the user device 708 can be a general desktop computer or laptop, or can be a wireless device, such as a smart phone or personal digital assistant. The user device 708 can be operated by a user of the electronic bypass tool 710 and/or a recipient of an output (e.g., a report) generated by the electronic bypass tool 710. In an embodiment, one or more of the user devices 708 can be directly attached to the host system 702.

The networks 706 can be any type of known networks in the art. For example, the networks 706 can be a combination of public (e.g., Internet), private (e.g., local area network, wide area network, virtual private network), and can include wireless and wire line transmission systems (e.g., satellite, cellular network, terrestrial networks, etc.).

In an embodiment, the electronic bypass tool 710 can be distributed across multiple processors, for example, in the host system 702 and one or more user devices 708.

Technical effects of embodiments include providing a safety interlock electronic bypass system that can support approval and workflow processes that can be customized based on customer requirements. Embodiments can also provide a database that includes records related to plant interlock systems that are stored and backed up to avoid loss of data. Embodiments can also provide an automated notification system that utilizes electronic mail to request action from specified employees (e.g., those identified in the approval and workflow processes). In addition, embodiments can send reminders to employees when their approval time has expired and an approval (or denial) has not been received. Further, embodiments can perform an automated escalation process to higher levels of authority if a specified employee fails to take a requested action within a stipulated time period.

Set forth below are some embodiments of methods for providing an electronic bypass system, computer program products for providing an electronic bypass system, and electronic bypass systems.

Embodiment 1

A method for providing an electronic bypass system, the method comprising receiving a request to bypass a plant interlock system, and facilitating a review of the request. The facilitating is based on input from at least one reviewer and results in the request being approved or not approved. The facilitating includes: notifying at least one reviewer of the request, storing the request and a status of the request in a database that includes bypass statuses of a plurality of plant interlock systems, and prompting the at least one reviewer to respond based on not receiving input from the at least one reviewer within a specified review time period. The request and a status of the request are stored in a database that includes bypass statuses of a plurality of plant interlock systems. The at least one reviewer of the request is prompted to respond based on not receiving input from the at least one reviewer within a specified review time period. The status of the request is updated in the database to approved or not approved based on the result of the review. A report that includes the status of the request is generated.

Embodiment 2

The method of Embodiment 1, wherein the method further comprises receiving the input from the reviewer and updating an interim status of the request based on the input.

Embodiment 3

The method of any of Embodiments 1-2, wherein the method further comprises initiating placing the plant interlock system in a bypass state based on the request being approved.

Embodiment 4

The method of any of Embodiments 1-3, wherein the method further comprises transmitting a reminder to reactivate the plant interlock system.

Embodiment 5

The method of any of Embodiments 1-4, wherein the transmitting a reminder is based on the plant interlock system being in the bypass state for a specified bypass time period.

Embodiment 6

The method of any of Embodiments 1-5, wherein the method further comprises performing an escalation process based on the plant interlock system being in the bypass state for a specified bypass time period.

Embodiment 7

The method of any of Embodiments 1-6, wherein the report is generated prior to the review of the request completing and the report includes an interim status of the request.

Embodiment 8

The method of any of Embodiments 1-7, wherein the method further comprises transmitting the report to an interested party.

Embodiment 9

The method of any of Embodiments 1-8, wherein the review includes an escalation process when the input from the at least one reviewer is not received within the specified review time period.

Embodiment 10

The method of any of Embodiments 1-9, wherein there the at least one reviewer includes two or more reviewers.

Embodiment 11

The method of any of Embodiments 1-10, wherein the report further includes statuses of additional requests and is based on contents of the database.

Embodiment 12

The method of any of Embodiments 1-11, wherein the at least one reviewer of the request varies based on at least one of a type of the plant interlock system and a bypass duration associated with the request.

Embodiment 13

A computer program product for providing an electronic bypass system. The computer program product comprises a storage medium embodied with computer-readable program instructions which, when executed by a computer, cause the computer to implement any of Embodiments 1-12.

Embodiment 14

An electronic bypass system. The system comprises a computer processor and logic executable by the computer processor, the logic configured to implement any of Embodiments 1-12.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable. RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the present application.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

The terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s)

includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method for providing an electronic bypass system, the method comprising:
    receiving a request to bypass a plant interlock system, the plant interlock system comprising a measurement sensor, a comparator, a controller, and a control valve to control a flow of gas or liquid out of a container;
    facilitating, by a computer, a review of the request, the review resulting in the request being approved or not approved based on input from at least one reviewer, the facilitating including:
        notifying the at least one reviewer of the request;
        storing the request and a status of the request in a database that includes bypass statuses of a plurality of plant interlock systems; and
        prompting the at least one reviewer of the request to respond based on not receiving input from the at least one reviewer within a specified review time period;
    updating the status of the request in the database to approved or not approved based on the result of the review;
    generating a report that includes the status of the request;
    placing the plant interlock system into a bypass state based on the request being approved;
    adjusting the control valve based on a control valve adjustment value output by the controller; and
    removing the bypass of the plant interlock system in response to a reminder to reactivate the plant interlock system.

2. The method of claim 1, further comprising receiving the input from the at least one reviewer and updating an interim status of the request based on the input.

3. The method of claim 1, wherein the transmitting a reminder is based on the plant interlock system being in the bypass state for a specified bypass time period.

4. The method of claim 1, further comprising performing an escalation process based on the plant interlock system being in the bypass state for a specified bypass time period.

5. The method of claim 1, wherein the report is generated prior to the review of the request completing and the report includes an interim status of the request.

6. The method of claim 1, further comprising transmitting the report to an interested party.

7. The method of claim 1, wherein the review includes an escalation process when the input from the at least one reviewer is not received within the specified review time period.

8. The method of claim 1, wherein there the at least one reviewer includes two or more reviewers.

9. The method of claim 1, wherein the report further includes statuses of additional requests and is based on contents of the database.

10. The method of claim 1, wherein the at least one reviewer of the request varies based on at least one of a type of the plant interlock system and a bypass duration associated with the request.

11. The method of claim 1, wherein the comparator is hardware based.

12. A computer program product for providing an electronic bypass system, the computer program product comprising:
    a non-transitory storage medium embodied with computer-readable program instructions which, when executed by a computer, cause the computer to implement a method comprising:
        receiving a request to bypass a plant interlock system, the plant interlock system comprising a measurement sensor, a comparator, a controller, and a control valve to control a flow of gas or liquid out of a container;
        facilitating, by a computer, a review of the request, the review resulting in the request being approved or not approved based on input from at least one reviewer, the facilitating including:
            notifying the at least one reviewer of the request;
            storing the request and a status of the request in a database that includes bypass statuses of a plurality of plant interlock systems; and
            prompting the at least one reviewer of the request to respond based on not receiving input from the at least one reviewer within a specified review time period;
        updating the status of the request in the database to approved or not approved based on the result of the review;
        generating a report that includes the status of the request;
        placing the plant interlock system into a bypass state based on the request being approved;
        adjusting the control valve based on a control valve adjustment value output by the controller; and
        removing the bypass of the plant interlock system in response to a reminder to reactivate the plant interlock system.

13. The computer program product of claim 12, wherein the computer-readable program instructions further cause the computer to implement performing an escalation process based on the plant interlock system being in the bypass state for a specified bypass time period.

14. The computer program product of claim 12, wherein the review includes an escalation process when the input from the at least one reviewer is not received within the specified review time period.

15. The computer program product of claim 12, wherein the at least one reviewer of the request varies based on at least one of a type of the plant interlock system and a bypass duration associated with the request.

16. An electronic bypass system comprising:
    a computer processor; and
    logic executable by the computer processor, the logic configured to implement a method, the method comprising:
        receiving a request to bypass a plant interlock system, the plant interlock system comprising a measurement sensor, a comparator, a controller, and a control valve to control a flow of gas or liquid out of a container;

facilitating, by a computer, a review of the request, the review resulting in the request being approved or not approved based on input from at least one reviewer, the facilitating including:

notifying the at least one reviewer of the request;

storing the request and a status of the request in a database that includes bypass statuses of a plurality of plant interlock systems; and prompting the at least one reviewer of the request to respond based on not receiving input from the at least one reviewer within a specified review time period;

updating the status of the request in the database to approved or not approved based on the result of the review;

generating a report that includes the status of the request;

placing the plant interlock system into a bypass state based on the request being approved;

adjusting the control valve based on a control valve adjustment value output by the controller; and removing the bypass of the plant interlock system in response to a reminder to reactivate the plant interlock system.

* * * * *